(12) United States Patent
Powers et al.

(10) Patent No.: US 7,328,496 B2
(45) Date of Patent: Feb. 12, 2008

(54) APPARATUS FOR REBUILDING GAS TURBINE ENGINE BLADES

(75) Inventors: John Matthew Powers, Independence, KY (US); Brian Dudley Dorrel, Batesville, IN (US)

(73) Assignee: General Electric Company, Schenectady, NY (US)

( * ) Notice: Subject to any disclaimer, the term of this patent is extended or adjusted under 35 U.S.C. 154(b) by 454 days.

(21) Appl. No.: 10/699,320

(22) Filed: Oct. 31, 2003

(65) Prior Publication Data

US 2005/0091846 A1  May 5, 2005

(51) Int. Cl.
*B23Q 7/00* (2006.01)
*B23Q 3/00* (2006.01)

(52) U.S. Cl. .................. 29/559; 29/23.51; 29/464; 451/365

(58) Field of Classification Search .............. 29/23.51, 29/889.1, 889.7, 559, 464, 281.1; 451/365; 269/269, 270, 287, 288
See application file for complete search history.

(56) References Cited

U.S. PATENT DOCUMENTS

| | | | | |
|---|---|---|---|---|
| 455,414 A * | 7/1891 | Searle | ........................ | 269/246 |
| 2,669,013 A * | 2/1954 | Wilson | ........................ | 269/46 |
| 2,907,233 A * | 10/1959 | Broffitt | ........................ | 408/12 |
| 3,331,166 A * | 7/1967 | Brenning | ........................ | 451/365 |
| 3,984,212 A | 10/1976 | DeMusis | | |
| 4,028,788 A | 6/1977 | DeMusis | | |
| 4,285,108 A * | 8/1981 | Arrigoni | ........................ | 29/889.1 |
| 4,638,602 A | 1/1987 | Cavalieri | | |
| 4,829,720 A | 5/1989 | Cavalieri | | |
| 5,230,183 A * | 7/1993 | Wagner, Jr. | .................. | 451/365 |
| 5,645,466 A * | 7/1997 | Wikle | ........................ | 451/5 |
| 6,568,993 B1 | 5/2003 | Jones et al. | | |
| 6,792,655 B2 * | 9/2004 | Wah | ........................ | 29/23.51 |
| 2002/0052168 A1* | 5/2002 | White | ........................ | 451/5 |

* cited by examiner

*Primary Examiner*—David P. Bryant
*Assistant Examiner*—Sarang Afzali
(74) *Attorney, Agent, or Firm*—William Scott Andes; Armstrong Teasdale LLP

(57) ABSTRACT

An apparatus for aligning a gas turbine engine blade including an airfoil and a dovetail is provided. The apparatus includes at least one locator pin configured to engage a serration formed on the blade dovetail, a locator block supporting said locator pin where said locator block comprises at least one groove sized to receive said locator pin therein, and a slide block assembly for engaging a dovetail surface opposite the serration where said slide block assembly is configured to position the blade dovetail against said locator pin. The apparatus also includes a base member comprising a platform comprising an end plate, a bottom surface, and an opposite upper surface for supporting said slide block assembly and said locator block, said slide block assembly is slidably coupled to said platform upper surface, said platform upper surface defining a slotted opening extending through said bottom surface, said opening configured to receive the blade airfoil.

15 Claims, 4 Drawing Sheets

APPARATUS FOR REBUILDING GAS TURBINE ENGINE BLADES

BACKGROUND OF THE INVENTION

This invention relates generally to gas turbine engines, and more specifically to turbine blades used in gas turbine engines.

In at least some gas turbine engines, turbine blades used within the engine are cast to an approximate final shape. Portions of the turbine blades, including, but not limited to, a root portion, are then shaped to a final desired form by a shaping technique, such as grinding. The finished turbine blades are assembled into a turbine disk or rotor, such that a "dovetail" formed on each turbine blade engages a complimentarily shaped slot on the turbine disk.

Generally, turbine blades are constructed from a high-temperature, high-strength alloy that is adapted to withstand the temperatures and stresses imposed on the parts of a turbine assembly. Because of the high cost of materials, casting operations, and finishing operations, some turbine blades, after being in service, are refurbished to restore the original aerodynamic contours of portions of the blades. At least some known turbine blade repairs require building up the surface being repaired with a weld bead, and then grinding the surface back to its original contour.

Occasionally, while refurbishing a turbine blade, because the dovetail section has been housed in the rotor disk slot and out of the gas stream. It may be the only datum available for referencing for the grinding operation. However, because the dovetail serrations may be small, in many applications, the clamping mechanisms may inhibit operation of the grinding machines. In contrast, other clamping arrangements use long locating pins to clamp the component such that grinding equipment operations are not inhibited. However, because such fixtures must generally be very large to generate a sufficient clamping force, such fixtures are generally much more expensive and far less portable than other clamping mechanisms.

BRIEF DESCRIPTION OF THE INVENTION

In one aspect, a method for repairing a turbine blade for a gas turbine engine is provided. The method includes securing the blade into a clamping fixture, obtaining a zero reference from a gauging surface on the clamping fixture, coupling the clamping fixture to a grinding machine, and grinding the blade based on the zero reference.

In another aspect, an apparatus for aligning a gas turbine engine blade including a dovetail is provided. The apparatus includes at least one locator pin configured to engage a serration formed on the blade dovetail, a locator block supporting the locator pin, wherein the locator block comprises at least one groove sized to receive the locator pin therein, and a slide block assembly for engaging a dovetail surface opposite the serration. The slide block assembly is configured to position the blade dovetail against the locator pin.

In another aspect, a tool for securing a turbine blade including a dovetail is provided. The tool includes a pair of locator pins configured to engage adjacent serrations defined in the turbine blade. Each locator pin includes a first end, a second end, and a clamping section extending therebetween. The clamping section has a length that is substantially equal to a length of the blade dovetail. A locator block supports the locator pins. The locator block includes a plurality of grooves to receive each locator pin therein. A slide block assembly is configured to engage the blade dovetail opposite the locator pins such that the blade dovetail is secured in the tool by the locator pins.

DETAILED DESCRIPTION OF THE INVENTION

Figure 1:
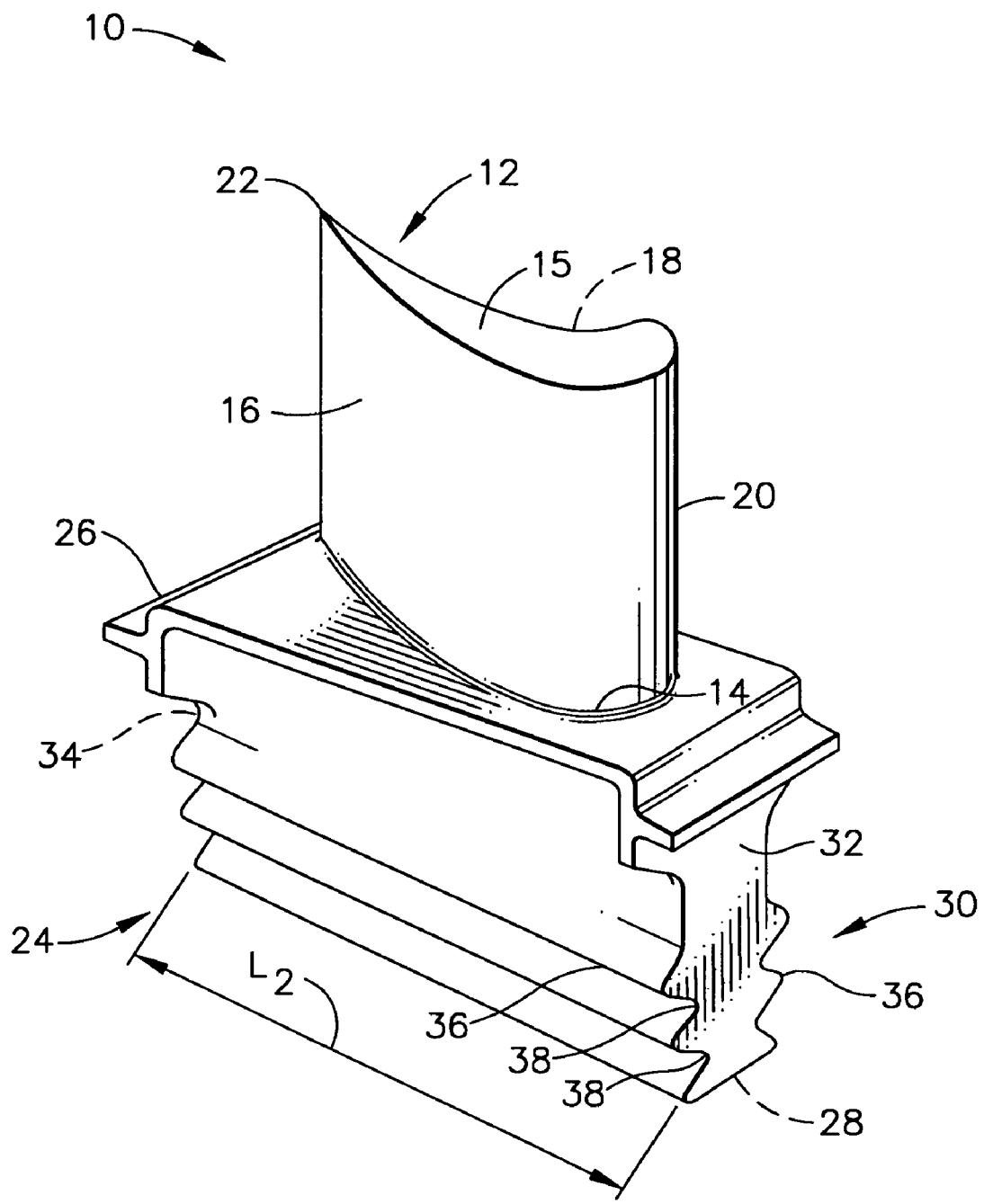
FIG. 1 is a perspective view of an exemplary turbine blade for use in a gas turbine engine.

FIG. 1 is a perspective view of an exemplary turbine blade 10 that may be used with a gas turbine engine (not shown). Blade 10 includes an airfoil 12 that extends radially outward from a blade root 14 to an airfoil tip 15. Airfoil 12 includes a first contoured sidewall 16 and a second sidewall 18. Sidewalls 16 and 18 are joined at a leading edge 20 and at an axially-spaced trailing edge 22.

Blade 10 also includes an integral dovetail 24 that is used for mounting blade 10 in a rotor or disk that has a complimentarily dovetail-shaped slot (not shown) for receiving dovetail 24. Dovetail 24 is tapered from a platform 26 proximate blade root 14 to a radially inner surface 28, and includes a plurality of serrations 30 defined therein. Serrations 30 extend from a leading edge side 32 of dovetail 24 to a trailing edge side 34. Serrations 30 create a wavelike cross-sectional profile for dovetail 24 which has a series of alternating peaks 36 and valleys 38.

Figure 2:
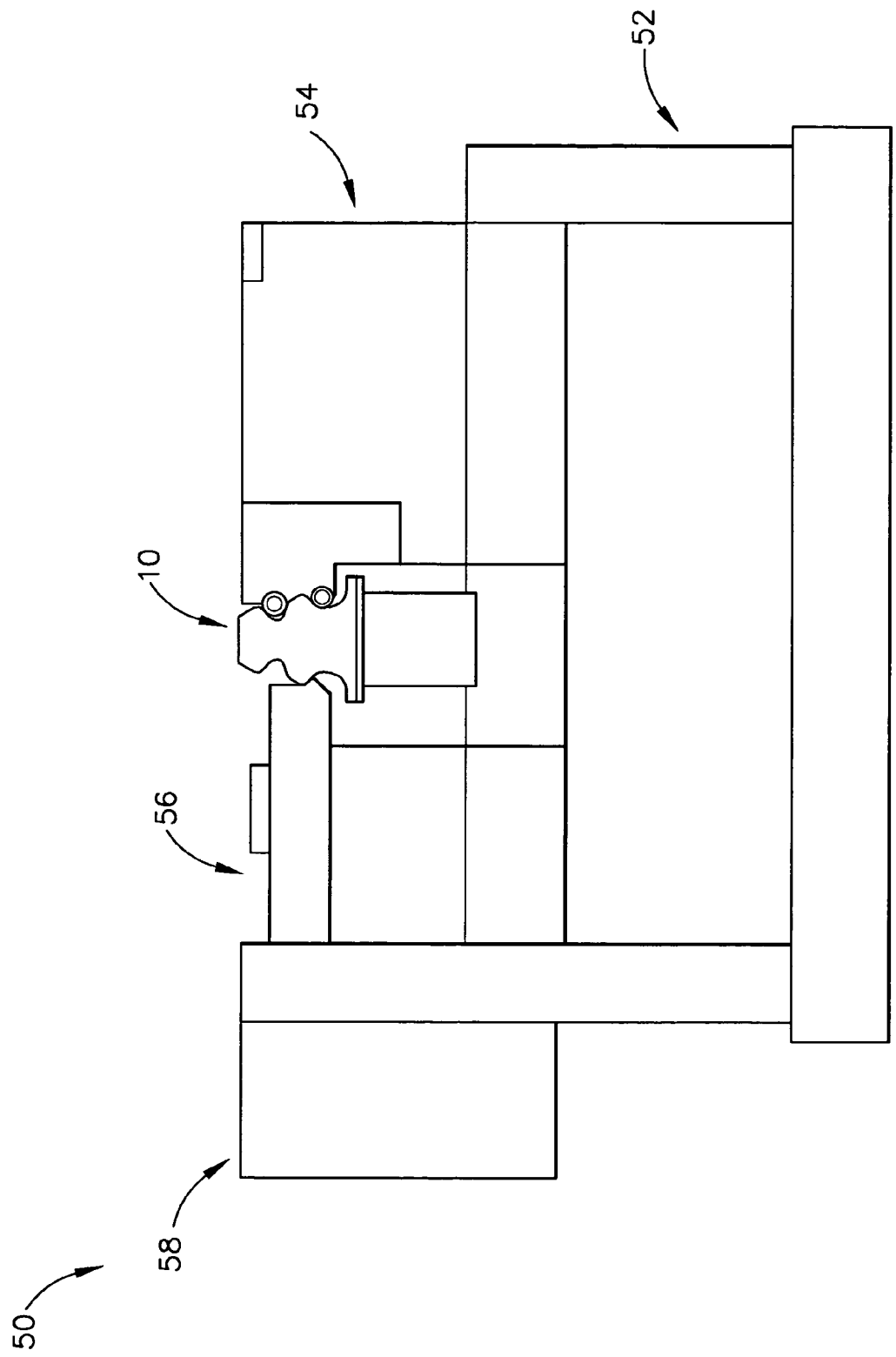
FIG. 2 is a schematic view of an exemplary fixture used to secure a turbine blade.
Figure 3:
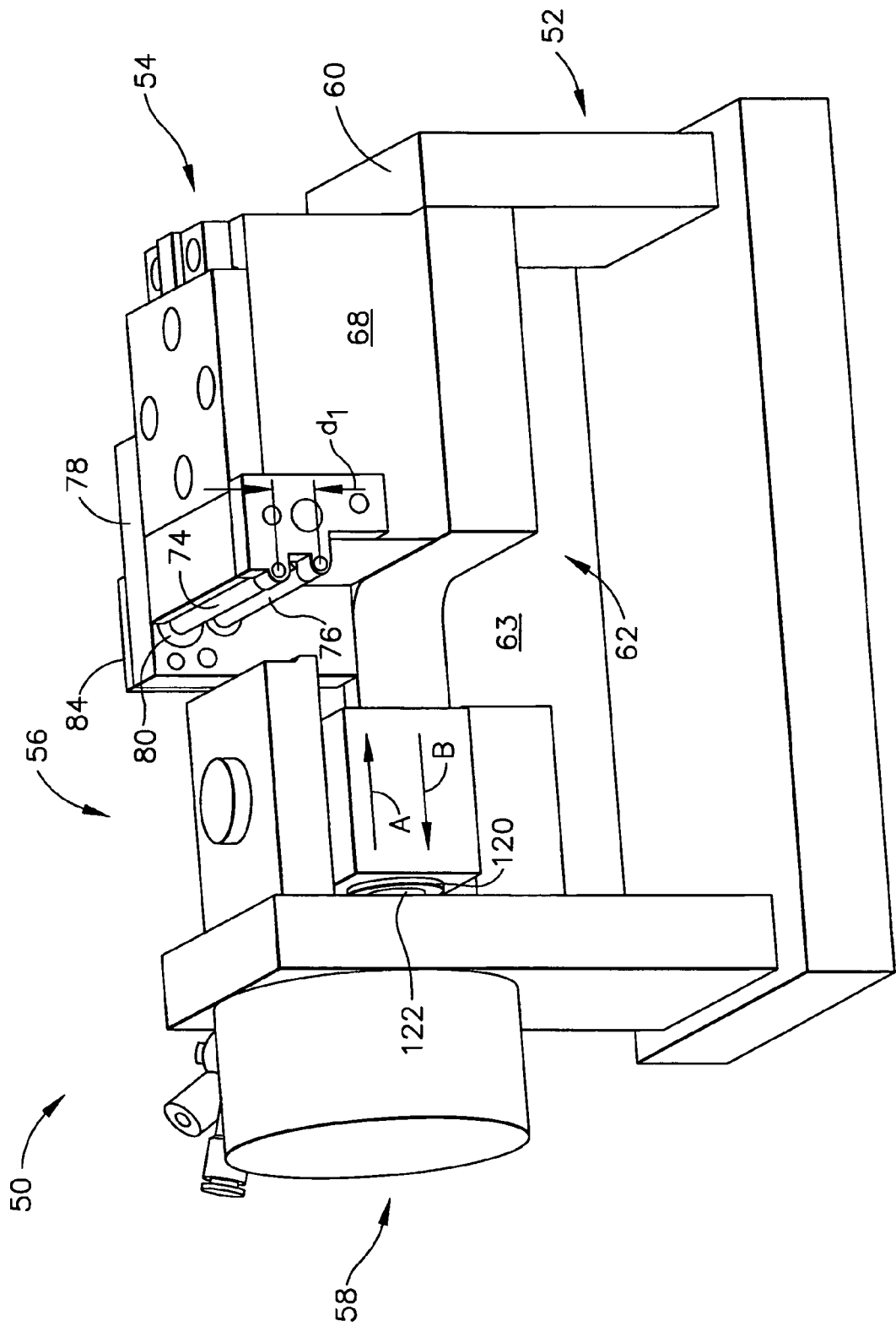
FIG. 3 is a perspective view of the fixture shown in FIG. 2.
Figure 4:
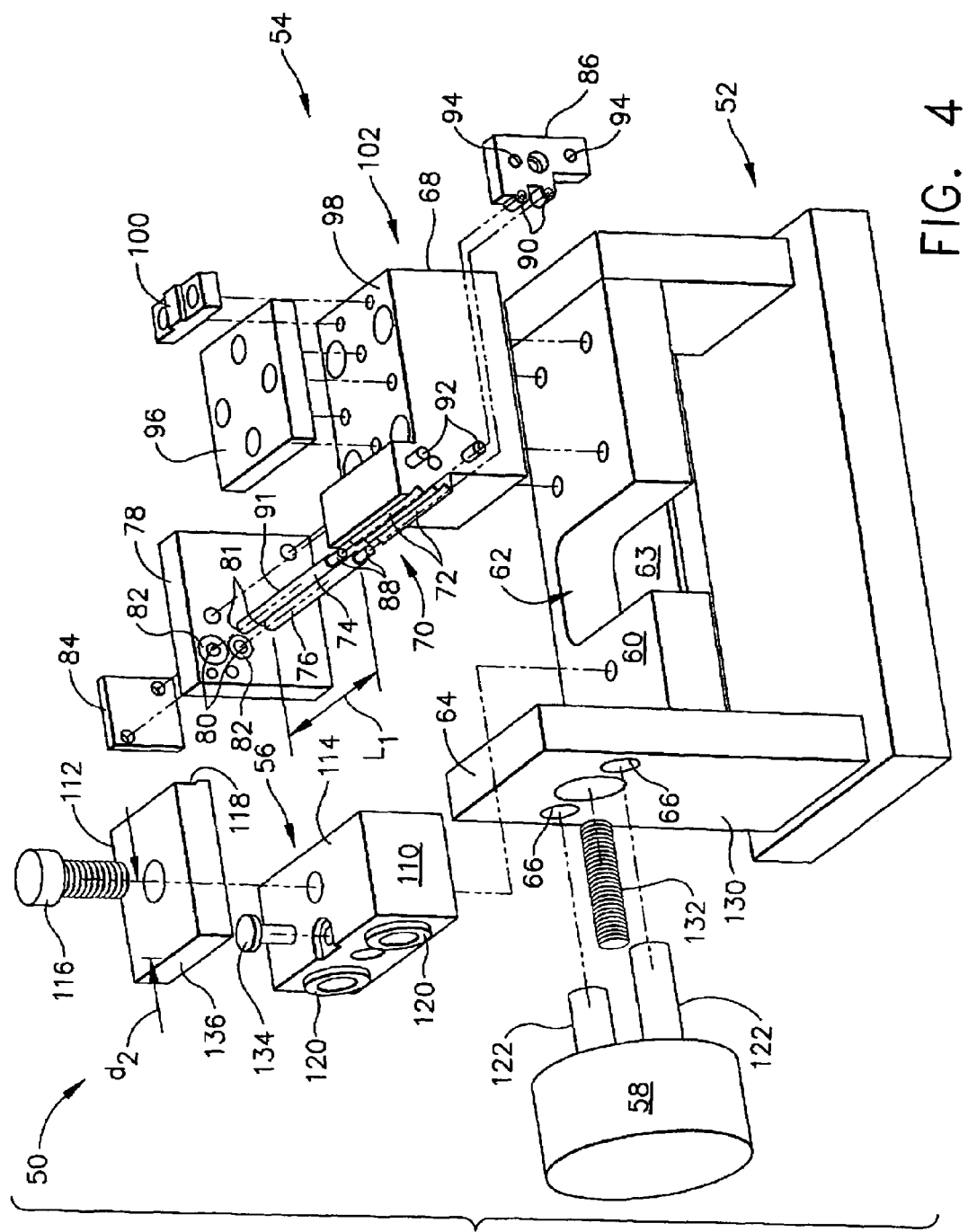
FIG. 4 is an exploded view of the fixture shown in FIG. 3.

FIG. 2 is a schematic view of an exemplary fixture 50 used for securing a component, such as blade 10. FIG. 3 is a perspective view of fixture 50. FIG. 4 is an exploded view of fixture 50.

As used herein, the terms "repair" and "repairing", may include any repair/inspection process. For example, repair processes may include various known repair techniques including welding, grinding, and/or machining. The above examples are intended as exemplary only, and thus are not intended to limit in any way the definition and/or meaning of the terms "repair" and repairing". In addition, as used herein the term "component" may include any object to which a repair process is applied. Furthermore, although the invention is described herein in association with a gas turbine engine, and more specifically for use with a turbine blade for a gas turbine engine, it should be understood that the present invention may be applicable to any component and/or any repair process. Accordingly, practice of the present invention is not limited to the repair of turbine blades or other components of gas turbine engines.

Fixture 50 includes a base member 52, a locator assembly 54, a slide block assembly 56, and a drive cylinder 58. Base member 52 includes a substantially planar platform 60 that supports locator block assembly 54 and slide block assembly 56. Platform 60 includes a slotted opening 62 defined therein. A reinforcing support rail 63 extends below platform 60. Base member 52 includes an end plate 64 that extends outward from platform 60. In the exemplary embodiment, end plate 64 is substantially perpendicular to platform 60. End plate 64 includes a plurality of attachment holes 66 which enable drive cylinder 58 to couple to slide block assembly 56.

Locator assembly 54 includes a locator block 68 having a clamping end 70 that includes a pair of recessed grooves 72 defined therein. Grooves 72 are sized to partially receive upper and lower cylindrically shaped locator pins 74 and 76 respectively, therein. Locator pins 74 and 76 are spaced a distance $d_1$ which enables pins 74 and 76 to be partially inserted into a pair of adjacent dovetail serrations 30 when blade 10 is received in fixture 50. In the exemplary embodiment, locator pins 74 and 76 are identical and are substantially cylindrical roll pins. Locator pins 74 and 76 each includes a shouldered end 88 and a clamping portion 91 that extends between ends 81 and 88 and has a length $L_1$ that is substantially equal to a length $L_2$ (shown in FIG. 1) of dovetail section 24.

A locator pin bushing plate 78 is coupled to locator block 68 and includes a pair of apertures 80 that each receive a respective end 81 of locator pins 74 and 76 within bushings 82 installed in apertures 80. A retainer plate 84, and a locator pin lock plate 86 are coupled to opposite sides of locator block 68 and bushing plate 78 to retain pins 74 and 76. Locator pin shouldered ends 88 are received in apertures 90 defined in lock plate 86.

Locator block 68 includes a pair of pins 92 that are received in apertures 94 defined in lock plate 86 for positioning lock plate 86 with respect to locator block 68. A gauge plate 96 is coupled to an upper surface 98 of locator block 68 and a gauge set block 100 is coupled against gauge plate 96 at a side edge 102 of locator block 68.

Slide block assembly 56 includes a slide block body 110 and a push block 112 that is coupled to an external surface 114 of slide block body 110 by a fastener 116. Push block 112 includes a contoured edge 118 that engages with blade dovetail 24.

Drive cylinder 58 is coupled against an outer surface 130 of end plate 64. Bushings 120 within slide block body 58 are sized to receive shafts 122 extending from drive cylinder 58. More specifically, bushings 120 facilitate controlling movement of slide block body 110 across platform 60. In the exemplary embodiment, a threaded rod 132 and lock pin 134 are used to secure slide block assembly 56 to drive cylinder 58. It is to be understood, however, that other methods of coupling slide block assembly 56 to drive cylinder 58 may be used. In an exemplary embodiment, drive cylinder 58 is a pneumatic cylinder.

During operation, a component to be repaired, such as a turbine blade, first undergoes a process to build up the blade material in the area of the repair. This buildup may be accomplished by welding wherein one or more weld beads of blade material are applied to the blade surface.

Slide block assembly 56 is slidable across platform 60 in a first direction toward locator assembly 54, as indicated by arrow A, to clamp against turbine blade 10 such that turbine blade 10 is secured in position relative to fixture 50. Slide block assembly 56 is also retractable in a second direction, away from locator assembly 54, as indicated by arrow B, to release blade 10 from fixture 50. Movement of slide block assembly 56 is controlled by drive cylinder 58. In the exemplary embodiment, cylinder 58 is actuated by air pressure. An amount of travel can be limited by varying the position of slide block 56 relative to platform 60 using threaded rod 132. Moreover, a distance $d_2$ from fastener 116 to push block 112 is adjusted such that interference between push block 112 and end plate 64 limits travel of slide block assembly 56 in second direction B. In an exemplary embodiment, slide block assembly 56 has a range of travel from the clamped position to the retracted position of about 0.030 inches.

Fixture 50 clamps on turbine blade/dovetail 24. For blades that have been in service, dovetail 24 provides a datum reference for restoring turbine blade 10 to original dimensions. In fixture 50, dovetail 24 is clamped between locator pins 74 and 76 on one side, and push block 112 on the opposite side. Locator pins 74 and 76 are sized to substantially mate against dovetail 24 such that pins 74 and 76 engage adjacent dovetail serrations 30. Push block 112 substantially facilitates centering a respective dovetail peak 36 between locator pins 74 and 76. More specifically, locator pins 74 and 76 are received in grooves 72 such that locator block 68 facilitates providing structural support for the clamping load induced to locator pins 74 and 76.

When inserting blade 10 into fixture 50, push block 112 is initially retracted to allow insertion of blade dovetail 24. The push block travel length is adjusted such that dovetail 24 is retained in fixture 50 so that an operator does not have to physically hold blade 10 while clamping blade 10. More specifically, when inserted, blade 10 contacts locator pin bushing plate 78, which acts as a positioning stop. When air pressure is supplied to cylinder 58 blade 10 is clamped within fixture 50. After clamping blade 10 into fixture 50, gauge plate 96 and gauge set block 100 are used to establish a zero datum reference such that blade 10 can be measured to determine how much material should be removed during grinding to restore blade 10 to its dimensional specifications.

After clamping blade 10 into fixture 50, fixture 50 can be coupled to a grinding machine (not shown). The grinding machine may gain access to blade 10 via platform slot 62.

The above-described turbine blade root clamping fixture provides a cost effective and highly reliable apparatus that may be safely used for clamping turbine blades for grinding operations. The fixture provides a compact package that is capable of generating a sufficient clamping force to securely retain the blade for grinding while also providing access to the blade by the grinding equipment. The fixture also retains the turbine blade when the blade is released such that an operator can remove his hands from the fixture when clamping the blade.

Exemplary embodiments of a turbine blade root clamping apparatus are described above in detail. The clamping and locating assemblies are not limited to the specific embodiments described herein, but rather each component may be utilized independently and separately from other components described herein. Each component can also be used in combination with other turbine blade clamping and locating components.

While the invention has been described in terms of various specific embodiments, those skilled in the art will recognize that the invention can be practiced with modification within the spirit and scope of the claims.

What is claimed is:

1. An apparatus for aligning a gas turbine engine blade including an airfoil and a dovetail, said apparatus comprising:

at least one locator pin configured to engage a serration formed on the blade dovetail;

a stationary locator block supporting said locator pin, said locator block comprising at least one groove sized to receive said locator pin therein;

a slide block assembly for engaging a dovetail surface opposite the serration, said slide block assembly configured to position the blade dovetail against said locator pin; and a base member comprising a platform comprising an end plate, a bottom surface, and an opposite upper surface for supporting said slide block assembly and said locator block, said slide block assembly is slidably coupled to said platform upper surface, said locator block fixedly coupled to said platform upper surface, said platform upper surface defining a slotted opening extending through said bottom surface, said opening configured to receive the blade airfoil.

2. An apparatus in accordance with claim 1 wherein said end plate extends from said platform upper surface.

3. An apparatus in accordance with claim 2 further comprising a drive mechanism coupled to said end plate and said slide block for positioning said slide block.

4. An apparatus in accordance with claim 3 wherein said drive mechanism comprises a pneumatic cylinder.

5. An apparatus in accordance with claim 2 wherein said slide block assembly is movable between a first position wherein the blade dovetail is removable from the slide block assembly, and a second position, wherein the blade dovetail is secured to the slide block assembly.

6. An apparatus in accordance with claim 2 wherein said slotted opening provides access to the turbine blade.

7. An apparatus in accordance with claim 2 wherein said at least one locator pin further comprises a pair of opposed pins configured to retain the blade dovetail therebetween.

8. An apparatus in accordance with claim 2 wherein said slide block assembly comprises a push block for engaging, the dovetail surface opposite the serration, said push block configured to limit an amount of travel of said slide block.

9. An apparatus in accordance with claim 1 further comprising a gauge plate coupled to said locator block for positioning the turbine blade relative to said apparatus, said gauge plate comprising a gauge set block for providing a zero reference point.

10. An apparatus in accordance with claim 1 wherein said locator pin comprises a first end, second end, and a clamping section extending therebetween, said clamping section having a length that is substantially equal to a length of the blade dovetail.

11. An apparatus in accordance with claim 1 further comprising a locator plate comprising a stop for positioning the blade dovetail in said apparatus.

12. A tool for securing a turbine blade including an airfoil and a dovetail, said tool comprising:

a pair of locator pins configured to engage adjacent serrations defined in the turbine blade, each said locator pin comprising a first end, a second end, and a clamping section extending therebetween, said clamping section having a length that is substantially equal to a length of the blade dovetail;

a stationary locator block supporting said locator pins, said locator block comprising a plurality of grooves to receive each said locator pin therein;

a slide block assembly configured to engage the blade dovetail opposite said locator pins such that the blade dovetail is secured in said tool by said locator pins; and a base member comprising a platform comprising an end plate, a bottom surface, and an opposite upper surface for supporting said slide block assembly and said locator block, said slide block assembly is slidably coupled to said platform upper surface, said locator block fixedly coupled to said platform upper surface, said platform upper surface defining a slotted opening extending through said bottom surface, said slotted opening configured to receive the blade airfoil.

13. A tool in accordance with claim 12 wherein said end plate extends from said platform upper surface.

14. A tool in accordance with claim 13 wherein said slide block assembly is movable between a first position wherein the blade dovetail is removable from the tool, and a second position wherein the blade dovetail is secured within the tool and between said locator pins and said slide block assembly.

15. A tool in accordance with claim 12 further comprising a gauge plate coupled to said locator block for locating the turbine blade relative to said apparatus, said gauge plate comprising a gauge set block for providing a zero reference point.

* * * * *